UNITED STATES PATENT OFFICE.

ERNST PREISWERK, OF BASEL, SWITZERLAND, ASSIGNOR TO SOCIETY OF CHEMICAL INDUSTRY IN BASLE, OF BASEL, SWITZERLAND.

ALBUMIN-IRON-PHOSPHORUS COMPOUNDS AND A PROCESS OF MAKING SAME.

1,072,989.   Specification of Letters Patent.   Patented Sept. 9, 1913.

No Drawing.   Application filed June 20, 1912.  Serial No. 704,809.

*To all whom it may concern:*

Be it known that I, ERNST PREISWERK, a citizen of the Swiss Republic, and resident of Basel, Switzerland, doctor of philosophy and chemist, have invented new and useful Albumin-Iron-Phosphorus Compounds and a Process of Making Same, of which the following is a full, clear, and exact specification.

From the United States Letters Patent No. 754,803, dated March 15, 1904, it is apparent that the normal salts which the alkaline earths and the heavy metals form with the assimilable phosphorus compound (inositephosphoric acid) contained in vegetable foodstuffs, are completely insoluble in water. Since such insoluble salts can be absorbed by the organism either not at all or only with difficulty, the alkaline earth salts have been converted, for the purpose of therapeutic use, into acid alkaline earth salts (phytin) which are easily soluble in water. It has been found that this method is not applicable for producing soluble iron salts for even from solutions which are powerfully acid to congo the inositephosphoric acid is precipitated as an insoluble normal iron salt by addition of ferric chlorid. By filtering such a precipitate and drying it there is obtained a powder which is very resistant to chemical attack and is on this account therapeutically valueless, since it passes through the digestive track unchanged. In view of the high therapeutic value attaching to the simultaneous use of inositephosphoric acid and iron it is desirable to find the form of the iron salt both components of which are easily resorbed.

The present invention achieves this causing iron salts to act upon the organic phosphorus compound (free acid or its alkali or alkaline earth salts) in presence of albumin in such a manner that the albumin is at the same time precipitated so that the iron-salts of the organic phosphorus compound are adsorbed in the albumin. The iron salt thus obtained exhibits colloidal properties and retains them even after filtration and drying. When such a colloidal albumin-iron precipitate is subjected to artificial gastric digestion, the iron salt of the inosite-phosphoric acid remains in a so finely divided form that it runs through even the thickest filter and does not settle even after long standing. If this acid suspension is brought by means of sodium carbonate to the degree of alkalinity of the intestine, the iron salt dissolves completely at 37° C. after standing for about two hours. These conditions are the most favorable that can be conceived for the resorption of both components.

The invention is illustrated by the following example:

Example I: 160 parts of casein are stirred with 20 times their weight of water and dissolved by means of 26 parts by volume of caustic soda lye of 30 per cent. strength. This solution is run while stirring into a solution of 50 parts of the acid calcium-magnesium salt of the natural inositephosphoric acid obtained from plant seeds in 1600 parts of water containing 16 parts by volume of chemically pure hydrochloric acid. To the suspension thus obtained, which should still be acid in reaction, there is added a solution of ferric chlorid as feebly acid as possible, until the filtrate of a test portion is reddened with certainty by potassium sulfocyanid. The mixture is now filtered, the residue on the filter is washed and then dried, preferably by gentle heating in a vacuum. The product thus obtained contains about 7.5 per cent. of iron and about 6 per cent. of phosphorus.

Example II: 160 parts of egg albumin and 45 parts of neutral or amphoteric sodium salt of inositephosphoric acid are dissolved in 2500 parts of water with addition of 52 parts by volume of caustic soda lye of 30 per cent. strength. This solution is allowed to run as quickly as possible while stirring into a solution of 70 parts of ferric chlorid (of 60 per cent. strength) and 500 parts of common salt in 2000 parts of water heated to 80 to 90° C. The precipitate is filtered, well washed and dried. The product thus obtained contains about 7.8 per cent. of iron and 5 per cent. of phosphorus.

Example III: 100 parts of sesame flour, or another vegetable material rich in albumin and phosphorus, are stirred with 800 parts of water with addition of 10 parts of caustic soda lye of 30 per cent. strength. A solution of 3.1 parts of oxalic acid in 100 parts of water is added and the mixture filtered after it has been digested for several hours at 40° C. The clear filtrate is mixed with an aqueous solution of 7.5 parts of ferric chlorid (of 60 per cent. strength) and the precipitate produced is then filtered.

The dried product contains 13.8 per cent. of iron and 4.2 per cent. of phosphorus.

Instead of, as in the preceding Example III, extracting the vegetable albumin and organic phosphorus compound simultaneously, it is obviously possible to operate in such a manner that the albumin is first extracted, then the phosphorus compound dissolved by means of dilute acid and the precipitation with iron salt performed after addition of the necessary proportion of the extracted vegetable albumin. So also vegetable albumin may be used which is not derived from the same parent material as that from which the phosphorus compound is obtained.

The new products obtained as described from inositephosphoric acid constitute in a dry state yellowish-white powders, are insoluble in water and indifferent organic solvents, furnish on gentle heating with a sodium carbonate solution of 1 per cent. a nearly clear red-brown solution, which contains the iron salt dissolved in colloidal form capable of being recognized by means of a solution of haematoxylin.

What I claim is:—

1. A process for the manufacture of easily resorbed iron salts of the assimilable phosphorus compound (inositephosphoric acid) contained in plants, such iron salts being absorbed in albumin, which process consists in causing iron salts to act on the said phosphorus compound in presence of albumin.

2. As new products easily resorbed iron salts of inositephosphoric acid absorbed in albumin, which products constitute in a dry state yellowish-white powders, are insoluble in water and indifferent organic solvents, furnish on gentle heating with a sodium carbonate solution of 1 per cent. a nearly clear red-brown solution, which contains the iron salt dissolved in colloidal form capable of being recognized by means of a solution of haematoxylin.

In witness whereof I have hereunto signed my name this 11th day of June, 1912, in the presence of two subscribing witnesses.

ERNST PREISWERK.

Witnesses:
  GEO. GIFFORD,
  AMAND BRAUN.